Sept. 8, 1953
W. E. McBRIDE
2,651,321
AUTOMATIC BIRD FOUNTAIN OR BATH
Filed June 9, 1949
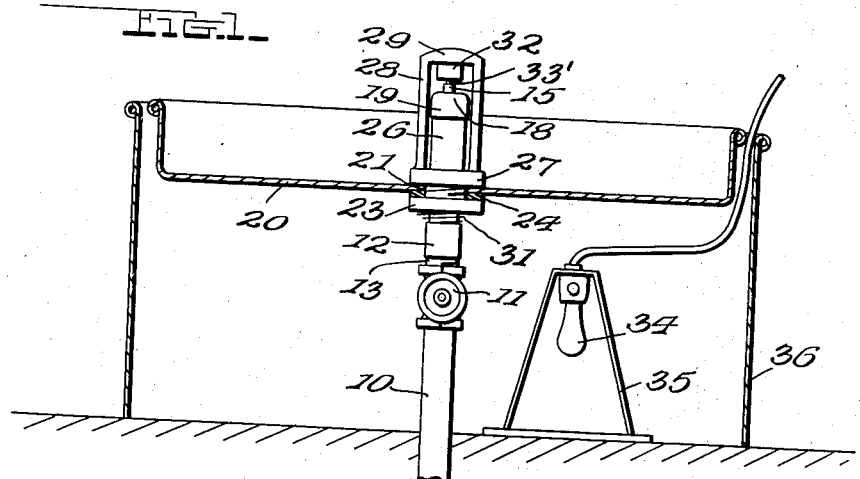
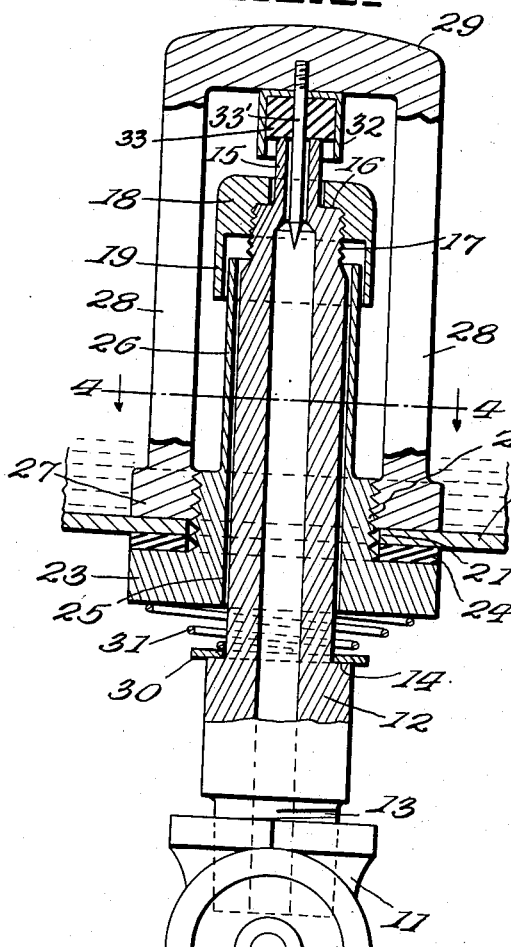
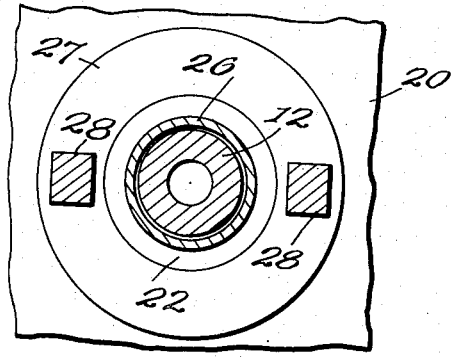
INVENTOR.
William E. McBride
BY
Bryant + Lowry
attys.

Patented Sept. 8, 1953

2,651,321

UNITED STATES PATENT OFFICE 2,651,321

AUTOMATIC BIRD FOUNTAIN OR BATH

William E. McBride, Woodstown, N. J.

Application June 9, 1949, Serial No. 98,135

1 Claim. (Cl. 137—408)

This invention relates to bird fountains or baths and has special reference to an automatic bird fountain or bath wherein the level of the water in a pan forming part of this invention is maintained at a substantially constant level.

One important object of this invention is to provide a novel device of this character having a valve so controlling a supply pipe for the fountain that as the amount and weight in a receiving pan decreases, the valve opens and that when the water is sufficient to restore the normal amount, the valve closes.

Another important object of this invention of this character wherein means are provided wherein the action of the valve may be so controlled that the level of water in the pan may be adjusted to suit the user.

A further object of the invention is to provide a novel arrangement of the valve used whereby the opening and closing of the valve used will maintain the water outlet in clear condition and free from any collection of flow obstructing matter.

A still further object of the invention is to provide a novel form of valve for the purpose set forth whereby the valve may be readily attached to an existing bird bath.

Yet another object of the invention is to provide a novel device for this purpose wherein heating means are provided for preventing possible freezing of water in the pan.

With the above and other objects in view, as will be presently apparent, the invention consists in general of certain novel details of construction and combinations of parts hereinafter fully described, illustrated in the accompanying drawings and particularly claimed.

In the accompanying drawings, like characters of reference indicate like parts in the several views, and Figure 1 is an elevational view, partly in section, showing the complete arrangement of the invention;

Figure 2 is an enlarged elevation, partly in section, of the valve used herein and shown closed;

Figure 3 is a view similar to the upper part of Figure 2 but showing the valve open; and Figure 4 is a section on the line 4—4 of Figure 2.

As here disclosed, there is provided a supply pipe 10 leading from any suitable source of water supply, such as a tank, city supply line or the like. A valve 11 of any ordinary construction controls the flow of water through this pipe. The pipe 10 preferably extends vertically up from the ground G and the valve 11 is preferably located at its upper end.

The automatically operating valve forming the subject of this invention includes a tubular inner member 12 having a nipple-like threaded lower end 13 by means of which it is screwed into the delivery opening of the valve 11. Just above the nipple 13 the member 12 is enlarged to provide a shoulder 14. Also, the upper end of the member 12 is reduced at 15 to provide a shoulder 16 below which this upper end is threaded as shown at 17. A cap 18, provided with an opening for the reduced end 15, is screwed on the threaded portion 17 and is provided at its periphery with a depending apron 19 spaced from the member 12.

The bath proper consists of a shallow pan 20 having a centrally disposed opening 21 in its bottom. Extending up through the opening 21 is a threaded stud 22 having a flanged lower end 23 between which and the pan there is provided a packing washer 24. The stud 22 is provided with a central opening 25 from the periphery of which rises a tubular sleeve 26 extending to the plane of the top edge of the pan 20.

The internal diameter of the opening 25 and sleeve 26 is such that the member 12 is freely slidable therein. Also the upper end of the skirt 26 projects within the apron 19 so that the cap and apron protect this upper end and prevent any accumulation of twigs, leaves or other matter apt to interfere with the free movement of the stud 22 and sleeve 26 on the member 12. Screwed on the upwardly projecting end of the stud 22 is the base 27 of a yoke member having a pair of legs 28 extending upwardly from the base, these legs being connected at their upper ends by a head 29. The base 27, flange 23 and washer 24 act to form a leak-tight joint between the pan 20 and the valve.

Seated on the shoulder 14 is a washer 30 supporting the lower end of a coiled compression spring 31, the upper end of which rests against the under surface of the flanged nipple or stud 22. The pipe 10 being fixedly positioned so likewise will the member 12 be fixedly positioned. The spring therefore tends to move the pan connected elements of the valve upwardly along the member 12. On the under side of the head 29 is fixed an inverted cup-shaped socket 32 of sufficient diameter to surround the reduced end 15 of the member 12 and thus prevent entry into the member 12 of extraneous matter. In this cup 32 is fixed a compressible valve seat 33 against which the upper end of the tubular member 12 engages to close said member and prevent passage of water whenever there is sufficient water in the pan to effect enough compression of the spring 31. Screwed into the head 29 and extending down through the cup 32 into the upper end of the passage through the member 12 is a stem 33'. This stem serves the double function of preventing too much lateral movement of the pan and the parts carried thereby and of keeping the water exit at the upper end of the member 12 clear of obstructions.

In order to prevent freezing of the valve and the water in the pan a heating unit, here shown as an electric lamp 34 may be supported on suitable means 35 beneath the pan and the space under the pan may be enclosed by a wall.

In operation, assuming the pan to be empty, the valve seat 33 will be in the raised position shown in Figure 3. Upon opening the valve 11 water will flow upwardly through the member 12 and escape through the open upper end 15 thereof and then flow downwardly into the pan. As the weight of the water in the pan increases the pan moves downwardly against the resistance of the spring 31. It is to be noted that the spring resistance may be varied in accordance with the strength of the spring itself, the thickness of the washer 30 or by entirely removing the washer 30. Upon the weight of water for which the spring arrangement has been set being reached, the yoke will have moved downwardly and the valve seat 33 will close on the member 12 and stop flow of water through said member. If, from evaporation or other cause, the water level in the pan sinks, the consequent loss of weight will permit the spring 31 to again open the valve. Thus the water level will vary but little from normal so long as the valve 11 is open.

As indicated above, the invention is purposed to provide an automatic fountain or bath for the use of bird life, thus being an outdoor installation in which birds may rest, bathe or sport at will, the relative large diameter of the pan and its open top offering an attractive structure to the birds during migration, the structure permitting the bird to alight on the margin of the pan, on the water surface, or on the top 29 exposed above the surface. The structure, formed of the two units—the fixedly positioned water-supply unit and the bath unit supported thereby—each of the elements rigidly connected, is especially formed to provide for the bird accommodation in such manner as to avoid likelihood of injury to the bird during its alighting activities, especially when soaring in its usual horizontal flight direction. This result is obtained by dimensioning the elements of the respective units in such manner that not only is there a lost motion relation between the units in the vertical or axial direction—to provide the control of the water to the pan, as above described—but also the relation of the elements of one unit to those of the other is such as to provide a limited lost-motion relation between the units additionally in the horizontal direction, the special form of spring 31 enabling the pan unit to have limited rocking action on the basis of a yieldable resistance pin 33' serving to limit the extent of movement at the top and the spacing of the units providing this limit in the bottom zone of the pan unit.

Hence, the bird, in flight, can alight on the margin of the pan or on the top 29 at considerable speed without danger, since the bath unit can yield in opposition to the spring resistance and thus cushion the impact value relative to the bird, the spring yielding in the proper direction but affording a resistance factor which produces cushioning effect, regardless of the direction of approach. As the alighting action ends the soaring of the bird, no further cushioning effect is needed, the bird being free to rest, bathe or otherwise disport itself until it again resumes migratory flight, the cushioning effect being designed to meet the conditions incident to alighting.

In producing the cushioning action, the semi-hour glass shape of the spring 31 with its wider end uppermost is of importance. This enables normal spring action in the vertical direction to meet the conditions of control of the water supply of the pan, and also enables a pseudo-pivotal or rocking effect under pressures in the transverse direction to produce the desired cushioning effect.

While there is herein shown and described the preferred embodiment of the invention, it is nevertheless to be understood that minor changes may be made therein without departing from the spirit and scope of the invention as claimed.

I claim:

In an automatic drinking fountain, a shallow pan having a bottom and a centrally disposed opening in said bottom, a tubular and externally threaded stud extending upwardly through said opening and having a circumferential flange on its lower end, a packing washer interposed between said bottom and said flange, a base member screwed on said stud against the bottom of the pan, a tubular sleeve forming an upwardly extending prolongation of the stud and terminating in the plane of the top edge of the pan, a water supply pipe extending upwardly through said stud and sleeve, said pipe having an upwardly facing shoulder at its lower end, and having a body fitting loosely in the stud and sleeve, a coiled compression spring surrounding said body between said shoulder and flange, said pipe having a reduced and threaded upper end extending above said sleeve and having a further reduced tubular extremity, a cap screwed on the pipe and having a depending apron extending loosely around the upper end of the sleeve, a pair of legs extending upwardly from said base member and extending over the reduced portion of said pipe to completely frame said pipe, a pin carried by the top of the frame and fitting loosely in the reduced portion of said pipe, and a compressible closure member interposed between said frame and the upper extremity of the pipe and coacting with the pipe to form a valve for controlling the flow of water from the reduced upper end of the pipe downwardly to said pan.

WILLIAM E. McBRIDE.

References Cited in the file of this patent

UNITED STATES PATENTS

| Number | Name | Date |
| --- | --- | --- |
| 24,692 | Bacon | July 5, 1859 |
| 232,724 | Jenkins | Sept. 28, 1880 |
| 879,558 | Ledoux | Feb. 18, 1908 |
| 1,131,046 | Dyer | Mar. 9, 1915 |
| 1,253,941 | Copeland | Jan. 15, 1918 |
| 1,581,158 | Beach | Apr. 20, 1926 |
| 1,702,973 | Lord | Feb. 19, 1929 |
| 2,031,723 | Martin | Feb. 25, 1936 |